United States Patent [19]

Helms

[11] 4,282,586
[45] Aug. 4, 1981

[54] DOPPLER LOG

[75] Inventor: Horst Helms, Bremen, Fed. Rep. Germany

[73] Assignee: Fried. Krupp Gesellschaft mit beschränkter Haftung, Essen, Fed. Rep. of Germany

[21] Appl. No.: 108,167

[22] Filed: Dec. 28, 1979

[30] Foreign Application Priority Data

Jan. 13, 1979 [DE] Fed. Rep. of Germany ....... 2901293

[51] Int. Cl.³ ............................................. G01S 15/88
[52] U.S. Cl. ......................................... 367/13; 367/91
[58] Field of Search ................................... 367/13, 91

[56] References Cited

U.S. PATENT DOCUMENTS

| 1,864,638 | 6/1932 | Chilowsky | 367/91 |
| 3,603,920 | 9/1971 | Stedtnitz | 367/91 |
| 3,691,513 | 9/1972 | Stednitz | 367/91 |
| 3,849,636 | 11/1974 | Helms | 235/150.27 |

*Primary Examiner*—Richard A. Farley
*Attorney, Agent, or Firm*—Spencer & Kaye

[57] ABSTRACT

In a Doppler log for a vehicle equipped with transmitting and receiving units associated with two mutually transverse measuring axes which are parallel to a plane defined by the longitudinal and transverse axes of the vehicle, for the emission of directed beams of sound energy in directions which extend along the measuring axes, each beam being inclined with respect to the plane by a known emission angle such that all of the beams are to the normal to the measuring axes, the transmitting units operating at selected, known transmitting frequencies, and each receiving unit being connected for receiving the reflected components of the sound energy from a respective emission direction, the log further including a Doppler frequency analyzer connected to the output of each receiving unit for producing a representation of the Doppler frequency component of the sound signal received by that receiving unit, and a ratio former connected to the output of each analyzer and the associated transmitting and receiving unit for producing an output signal representing the quotient of the respective Doppler frequency with the corresponding transmitting frequency, there are provided: summing members connected to the units for forming representations of the sum of the ratio former output signals associated with each measuring axis; multiplying members connected to the summing members for multiplying each sum representation by a representation of the cosecant of the associated emission angle; and a testing device connected to the multiplying members for comparing the multiplication results and emitting a signal indicating proper Doppler log operation whenever such multiplication results are substantially identical.

3 Claims, 2 Drawing Figures

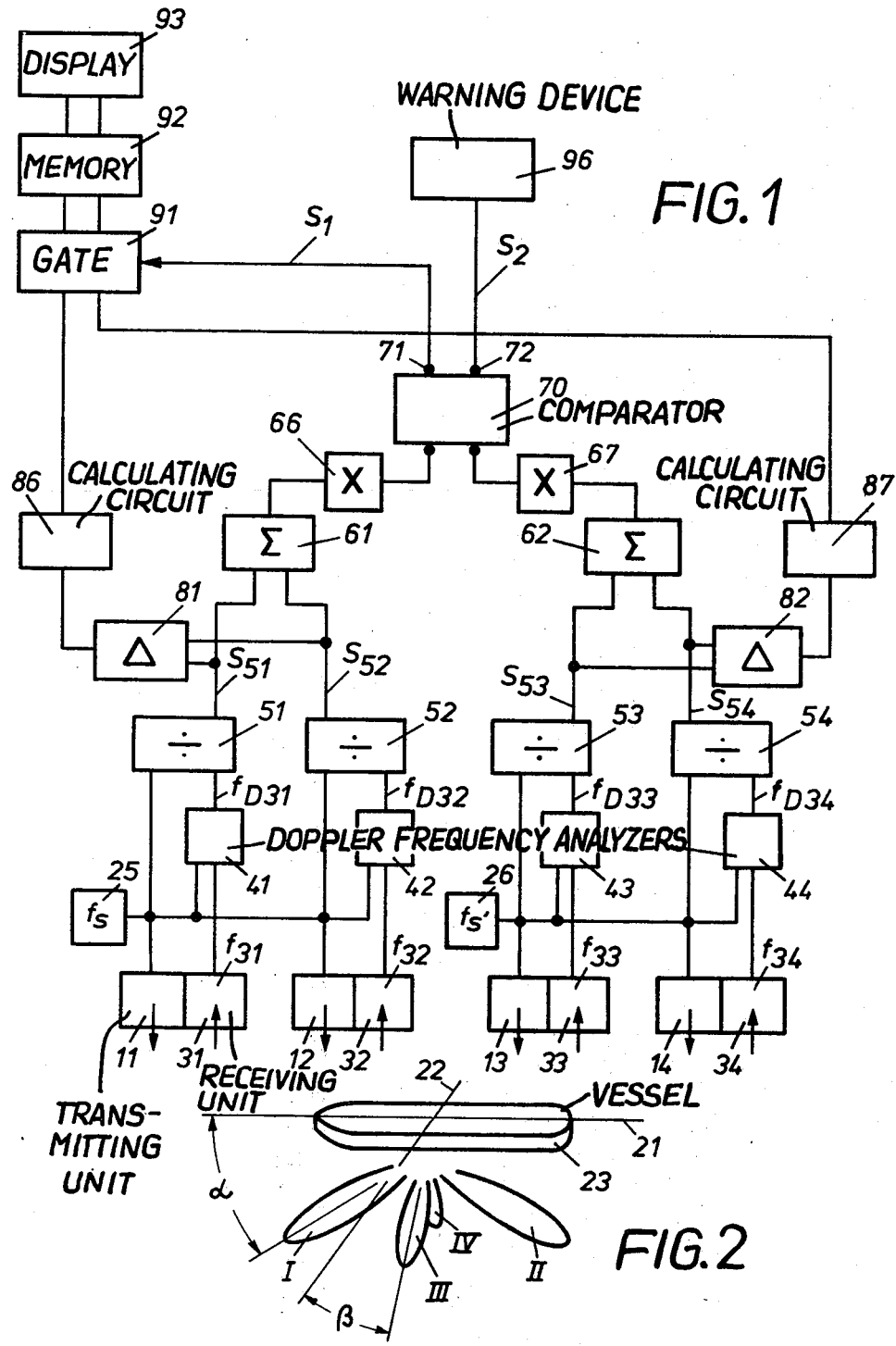

DOPPLER LOG

BACKGROUND OF THE INVENTION

The present invention relates to a Doppler log, or vehicle movement measuring and indicating device, having transmitting and receiving units arranged on two intersecting measuring axes which are both parallel to a plane defined by the longitudinal and transverse axes of the vehicle for the emission of focused sound energy in directions which are inclined along the measuring axes by known, and possibly mutually different, emission angles and which are symmetrical to the normal to the measuring axes.

The transmitting units of such devices operate with known transmitting frequencies, which are possibly different for the different directions. For receiving the reflected component of the sound energy from the various directions, each receiving unit is connected to a Doppler frequency analyzer and a ratio former which is connected with the transmitting unit for the same direction and whose output signal represents the quotient of the Doppler frequency divided by the transmitting frequency.

It is known to determine the speed of a vehicle by means of a Doppler log. For this purpose, U.S. Pat. Nos. 3,603,920 and 3,691,513, for example, disclose the emission of a beam of sound energy at a known transmitting frequency $f_s$ and at an emission angle of $\alpha$ with respect to the horizontal. This energy is reflected by the ground underneath the vehicle, i.e. for ships the sea bottom, and the reflected components of the sound energy are received again with their frequency shifted with respect to the transmitting frequency $f_s$ by the Doppler frequency $f_D$. The speed v of the vehicle is calculated from the Doppler frequency $f_D$ according to the following formula:

$$f_D = 2V/C \cdot f_s \cdot \cos \alpha,$$

where C is the speed of sound in the medium traversed by the beam.

When a Doppler log is used to navigate a vehicle it is of great importance for the vehicle operator to be able to depend at any time on the accuracy of the Doppler log and for malfunctions to be indicated at once. A malfunction exists, for example, if a school of fish crosses the path of the ship and prevents accurate measurement of the speed of the ship with respect to the ground. Such a malfunction is of very short duration, and can therefore not be prevented or compensated for by testing the circuit with the aid of test instruments outside of the actual measuring operation.

It is of particular importance to have an indication of the accuracy of the momentary measuring result of the Doppler log if the Doppler log is used in a navigation system together with a compass to determine the course with reference to the north, whereby integration of the speed over successive time intervals of identical length furnishes indications of successive sections of the course of the vehicle. This is disclosed, for example, in U.S. Pat. No. 3,849,636.

The measuring results produced by the Doppler log could here be checked by means of some other navigation system which may possibly be available on board, e.g. a radio navigation system. However, a comparison of the speed indication provided by the Doppler log via associated navigation with sections of the course traversed within given time periods, as determined with the aid of additional navigation systems, is time consuming and complicated. Moreover, this would determine only coincidence in principle of the total systems within the confines of the given measuring tolerances, but would not be an unequivocal indication of the correctness and accuracy of the momentary speed indication.

SUMMARY OF THE INVENTION

It is an object of the present invention to provide the capability for testing the operation of a Doppler log of the above-described type, by furnishing a continuous indication of the operational efficiency of the Doppler log during the performance of speed measurements.

These and other objects are achieved, according to the invention, in a Doppler log for a vehicle equipped with transmitting and receiving units associated with two mutually transverse measuring axes which are parallel to a plane defined by the longitudinal and transverse axes of the vehicle, for the emission of directed beams of sound energy in directions which extend along the measuring axes, each beam being inclined with respect to the plane by a known emission angle such that all of the beams are to the normal to the measuring axes, the transmitting units operating at selected, known transmitting frequencies, and each receiving unit being connected for receiving the reflected components of the sound energy from a respective emission direction, the log further including a Doppler frequency analyzer connected to the output of each receiving unit for producing a representation of the Doppler frequency component of the sound signal received by that receiving unit, and a ratio former connected to the output of each analyzer and the associated transmitting and receiving unit for producing an output signal representing the quotient of the respective Doppler frequency with the corresponding transmitting frequency, by the provision of summing means connected to the units for forming representations of the sum of the ratio former output signals associated with each measuring axis; multiplying means connected to the summing means for multiplying each sum representation by a representation of the cosecant of the associated emission angle; and testing means connected to the multiplying means for comparing the multiplication results and emitting a signal indicating proper Doppler log operation whenever such multiplication results are substantially identical.

The outputs of the multiplying means provide speed proportional values for the vehicle along vertical axes which are perpendicular to the two measuring axes. When the Doppler log is operating correctly, these values must be identical for both measuring axes, even if the vehicle is pitching and rolling, yawing or out of trim. Since a vehicle can by nature have only a single speed component in the vertical direction, this component can be determined from these values by calculations which take into consideration the speed of sound in the sound transmission medium.

According to one preferred embodiment of the invention, the testing circuit is constituted by a comparison circuit whose two inputs are connected with the outputs of the two multipliers. When its input signals are identical, a "good" signal appears at one output of the comparison circuit as a signal from the testing circuit. At a second output, the testing circuit produces an error indication signal, indicating a malfunction of the Doppler log, if the comparison circuit input signals are not identical, or differ by more than a selected amount.

The speed components of the vehicle along its two measuring axes are determined in two difference formers for the quotients and in series-connected calculating circuits, in that the Doppler frequencies are subtracted from one another with respect to the associated transmitting frequency per measuring axis and the difference result is multiplied by the reciprocal of the cosine of the associated emission angle.

According to an advantageous embodiment of the present invention, representations of these speeds are conducted, via a gating circuit, to, and stored in, an intermediate memory which is connected with a speed display. The "good" signal from the comparison circuit serves as the gate enabling signal. Representations of error containing measurements of the Doppler log are therefore not stored and displayed since no "good" signal will have enabled the gating circuit. The display of the last previously determined correct speeds remains in effect and the malfunction of the Doppler log is displayed by an error indication signal which, for example, actuates a warning device.

Use of the present invention is of particular advantage for a Doppler log which is used in a coupled navigation system, as described in U.S. Pat. No. 3,849,636, in order to be able to eliminate from the position calculation erroneous measurements provided by the Doppler log. The speed of the vehicle is measured at equidistant time intervals and the path traversed is calculated. If the apparatus according to the invention indicates a malfunction of the Doppler log, the coupled navigation can nevertheless be maintained in that the vehicle continues on its course at the same speed and the path traversed is determined from the last correctly determined measuring values for the speed by integrating those values over time until the Doppler log operates correctly again.

A particular advantage of the device according to the invention is that by simple determination of speed components along the vertical axis of the vehicle, based on the quotients of Doppler frequency and transmitting frequency with respect to each measuring axis, which are being determined in any event for an indication of speed, it is possible to obtain information about the operational efficiency of the entire system during operation of the Doppler log and to actuate a warning device when the Doppler log is producing an erroneous indication.

BRIEF DESCRIPTION OF THE DRAWING

FIG. 1 is a block circuit diagram of one preferred embodiment of the invention.

FIG. 2 is a simplified perspective view of a vehicle and the lobe pattern of the emitted sound beams of its associated Doppler log.

DESCRIPTION OF THE PREFERRED EMBODIMENTS

FIG. 1 illustrates a Doppler log according to the invention having four transmitting units 11, 12, 13 and 14 for the directed emission of sound energy. As shown in FIG. 2, two of these units produce sound emission lobes I and II each inclined at an emission angle $\alpha$ with respect to the longitudinal measuring axis 21, and two of the transmitting units produce sound emission lobes III and IV each inclined at an angle $\beta$ with respect to the transverse measuring axis 22, axes 21 and 22 being mutually perpendicular. In the direction of longitudinal axis 21, sound energy is radiated toward the front and rear, while along the transverse axis 22, sound energy is radiated toward the right and left.

The two transmitting units 11 and 12, which transmit along one measuring axis, are actuated by a common oscillator 25 for exciting those units at a radiation frequency $f_s$. Similarly, units 13 and 14, associated with the other measuring axis, are driven by a common oscillator 26 for exciting those units at a radiation frequency $f_s'$. This arrangement is provided since it is customary to use the same radiation frequency for the beams along one measuring axis. If, however, a different transmitting frequency is to be used to transmit along each measuring axis in each lobe I, II, III, IV, each transmitting unit 11, 12, 13 and 14 would have to be actuated by its own oscillator.

In order to be able to receive reflected components of the sound energy from the four lobes I, II, III, IV, four receiving units 31, 32, 34 and 34 are associated with the four transmitting units 11, 12, 13 and 14, respectively. Units 11, 31; 12, 32; etc. can be constructed for example, in the manner disclosed in U.S. Pat. No. 3,691,513. Each receiving unit 31–34 is associated with a respective one of four Doppler frequency analyzers 41, 42, 43 and 44. Each transmitting unit 11–14, its associated receiving unit 31–34 and its associated analyzer 41–44 are associated with a respective one of the lobes I–IV of FIG. 2. One input of each analyzer is connected to the output of an associated receiving unit 31–34, and the other input of each analyzer is connected to a respective one of the oscillators 25 and 26. Each analyzer 31, 32, 33 and 34, determines the difference between the respective received frequency $f_{31}$, $f_{32}$, $f_{33}$ or $f_{34}$, and the transmitting frequency $f_s$ or $f_s'$ to derive the corresponding Doppler frequency $f_{D31}$, $f_{D32}$ $f_{D33}$ or $f_{D34}$. Series connected ratio formers, or dividers, 51, 52, 53, 54 form output signals $S_{51}$, $S_{52}$, $S_{53}$ and $S_{54}$ which each represent the quotient of the Doppler frequency $f_{D31}$, $f_{D32}$, or $f_{D33}$, $f_{D34}$, respectively, and the transmitting frequency $f_s$ or $f_s'$, respectively.

The two ratio formers 51, 52 or 53, 54, respectively, which are connected to one of the two oscillators 25 or 26, respectively, are connected to the inputs of a respective sum former 61 or 62 whose output is connected to a respective multiplier 66 or 67, respectively, in which the sum of the quotients $$\frac{f_{D31}}{f_s} + \frac{f_{D32}}{f_s} \text{ or } \frac{f_{D33}}{f_s'} + \frac{f_{D34}}{f_s'},$$

respectively, is multiplied by the reciprocal of the sine, or by the cosecant, of the respective emission angle $\alpha$ or $\beta$ of the sound energy. The outputs of multipliers 66 and 67 are connected to inputs of a comparison circuit 70 in which their two output signals are checked for coincidence. In order to prevent slight variations such as may occur during fluctuation of measuring values, from being included in the evaluation the comparison circuit 70 includes a tolerance window of a given size.

The comparison circuit 70 has two outputs 71, 72. A "good" signal $S_1$ appears at the first output 71 if both input signals are identical or deviate from one another by a small amount which lies within the tolerance window. Otherwise an error signal $S_2$ is emitted at the second output 72.

The inputs of each of the sum formers 61 and 62 are connected in parallel with the inputs of a respective difference former 81 or 82 which is itself connected in series with a respective calculating circuit 86 or 87 for calculating the speed of the vehicle 23 in the direction of a respective one of the longitudinal and transverse axes 21 and 22.

The calculating circuits 86 and 87 are connected via a gating circuit 91 with an intermediate memory 92 and the gating circuit 91 is actuated by occurrence of a "good" signal $S_1$ which serves as the enabling signal for the gate. When such a "good" signal $S_1$ appears, the speeds determined by the calculating circuits 86 and 87 are fed into the intermediate memory 92. A display 93 connected in series with the intermediate memory 92 displays the speeds.

If a "good" signal $S_1$ does not appear, the gating circuit 91 remains blocked and the display 93 continues to indicate the most recently stored speeds. At the same time an error signal $S_2$ appears at the output 72 of comparator 70 and actuates a warning device 96 which indicates that the measuring values from the Doppler log at the moment do not furnish correct speed indications.

The circuitry for processing the transmitted and received sound signals to derive Doppler frequency and vessel velocity values can be constituted by many well-known circuits used to provide velocity values based on Doppler signals and which produce, at various points within the circuit, the Doppler frequency representations utilized in the practice of this invention.

Doppler log systems are well known in the art, see for instance U.S. Pat. No. 1,864,638.

It will be understood that the above description of the present invention is susceptible to various modifications, changes and adaptations, and the same are intended to be comprehended within the meaning and range of equivalents of the appended claims.

What is claimed is:

1. In a Doppler log for a vehicle equipped with transmitting and receiving units associated with two mutually transverse measuring axes which are parallel to a plane defined by the longitudinal and transverse axes of the vehicle, for the emission of directed beams of sound energy in directions which extend along the measuring axes, each beam being inclined with respect to the plane by a known emission angle such that all of the beams are symmetrical to the normal to the measuring axes, the transmitting units operating at selected, known transmitting frequencies, and each receiving unit being connected for receiving the reflected components of the sound energy from a respective emission direction, the log further including a Doppler frequency analyzer connected to the output of each receiving unit for producing a representation of the Doppler frequency component of the sound signal received by that receiving unit, and a ratio former connected to the output of each analyzer and the associated transmitting and receiving unit for producing an output signal representing the quotient of the respective Doppler frequency with the corresponding transmitting frequency, the improvement comprising: summing means connected to said units for forming representations of the sum of the ratio former output signals associated with each measuring axis; multiplying means connected to said summing means for multiplying each sum representation by a representation of the cosecant of the associated emission angle; and testing means connected to said multiplying means for comparing the multiplication results and emitting a signal indicating proper Doppler log operation whenever such multiplication results are substantially identical.

2. An arrangement as defined in claim 1 wherein said testing means comprise a comparison circuit having two outputs connected such that one of said outputs emits a "good" signal indicating proper Doppler log operation, and the other of said outputs emits an error indication signal if the multiplication results differ in value by more than a predetermined amount.

3. An arrangement as defined in claim 1 or 2 wherein there are two transmitting and receiving units transmitting and receiving sound energy along each measuring axis, and further comprising: two difference value formers each having inputs connected to receive the output signals from those ratio formers connected to said units associated with a respective measuring axis for providing a representation of the difference between the quotients represented by the output signals of the ratio formers connected thereto; calculating means connected to receive the representations provided by said difference value formers for providing representations of the current speed of the vehicle; an intermediate memory for storing such current speed representations; a display connected to said memory for displaying the value of the current vehicle speed representation stored in said memory; and a gating circuit connected ahead of said memory and having a gating input connected to said testing means for permitting delivery of current speed representations from said calculating means to said memory only upon emission of a signal indicating proper Doppler log operation.

* * * * *